UNITED STATES PATENT OFFICE.

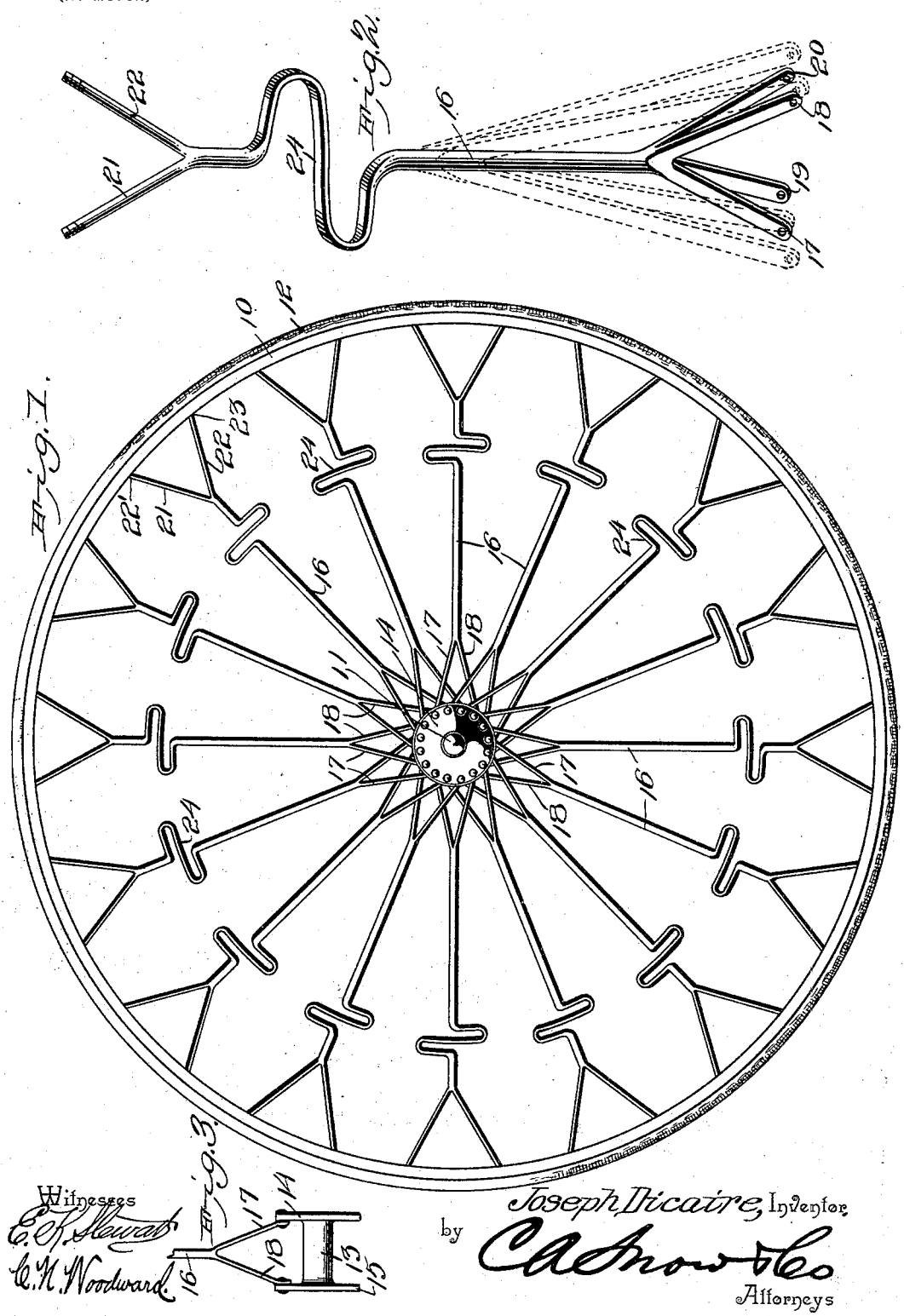

JOSEPH DICAIRE, OF ALPENA, MICHIGAN.

SPRING-WHEEL.

SPECIFICATION forming part of Letters Patent No. 709,142, dated September 16, 1902.

Application filed May 29, 1902. Serial No. 109,559. (No model.)

*To all whom it may concern:*

Be it known that I, JOSEPH DICAIRE, a citizen of the United States, residing at Alpena, in the county of Alpena and State of Michigan, have invented a new and useful Spring-Wheel, of which the following is a specification.

This invention relates to vehicle-wheels, more particularly to wheels having solid-rubber tires, wherein the spokes are provided with springs to secure resiliency to the wheel; and the invention consists in certain novel features of the construction, as hereinafter shown and described, and specifically pointed out in the claims.

In the drawings illustrative of the invention, Figure 1 is a side elevation of a wheel with the improvements embodied therein. Fig. 2 is an enlarged perspective view of one of the spokes detached. Fig. 3 is a side elevation of the hub detached.

The improvements may be applied to any form of buggy or carriage wheel or to bicycle or automobile wheels and generally to that class of wheels having metal rims and solid-rubber tires.

In the drawings the tire of the wheel is represented at 10, the axle at 11, and the rubber tire at 12, the rim being concaved on its outer surface to receive the tire in the ordinary manner.

The hub of the wheel consists of a tubular section 13, having flanges 14 15 on its ends, and will engage the axle preferably with the usual ball or roller bearings, the latter not being shown, as the construction is so well known and as they form no part of the present invention. The flanges 14 15 are provided with spaced apertures transversely through them near their rims, as shown, to afford means for the connection of the spokes, as hereinafter shown.

The spokes consist of the body-sections 16, each having a divided lower or hub end, as shown, the divisions being preferably four in number to each spoke and two of the divisions connected to the apertures in the flanges 14 15, as indicated. The four branches to each spoke are shown in Fig. 2 at 17, 18, 19, and 20, the branches 17 and 18 being connected to one of the flanges and the other branches, 19 20, being connected to the other flange, as shown. By this simple means each spoke is firmly braced from the flanges, which greatly strengthens the connections between the spoke and the flange. The branches may be connected respectively to every other set of the opposite apertures in the flanges, as indicated, which will increase the bracing form by spreading the branches farther apart, and thereby add to the efficiency of the connection. The outer ends of the spokes will be forked, as indicated at 21 22, and attached by their outer ends to the rim 10, as indicated at 22 23, which will furnish a bracing-support to the connection of the outer end of the spoke, and thereby greatly strengthen and stiffen it. Between the forked ends 21 22 and the body portion 16 the spokes will be bent into S shape, as shown at 24. By this means the spoke is firmly supported and braced where it is connected both to the hub and to the rim, and between the bracing portions it is provided with the spring feature 24, so that each spoke possesses a certain degree of resiliency which will yield to the pressure of the vehicle and its contents and will likewise yield in event of the wheel meeting with obstructions or running into cavities or when subjected to lateral strains. The spring features 24 will therefore produce the same effect as with the ordinary pneumatic tires and absorb all jars and concussions and prevent them from being imparted to the vehicle-body or the running-gear or the frame of the bicycle, as the case may be.

The parts may be of any required or suitable size and strength to proportion the device to the work required and to the vehicle to which it is applied.

When employed upon the heavier class of vehicles, such as automobiles, carriages, and the like, the spokes will be of a comparatively heavy material; but when employed upon bicycle-wheels the spokes will be of about the same gage of wire as the ordinary bicycle-wheel spokes. If preferred, the forked portions at the lower end of the spoke may be extended to a point near the spring portion 24, as indicated by dotted lines in Fig. 2, thereby practically eliminating the body-section 16 and materially increasing the bracing form of the inner portions of the spokes. This latter feature may be employed under certain conditions, but would not be a departure from the principle of the invention and would not sacrifice any of its advantages. As many of the spokes may be employed as required, but generally the number would about equal the spokes ordinarily employed in a vehicle-wheel in which comparatively small-gage wire spokes are employed. By this simple means a wheel is produced possessing all the advantages of the durability of the solid-rubber tire, together with the resiliency of the pneumatic or other form of cushion-tire, but at a very much less expense and at a greatly-increased degree of durability.

Having thus described my invention, what I claim is—

1. In a wheel of the class described, a spoke having a bifurcated inner or hub end, each member of the fork thus formed being divided at an angle to the bifurcation.

2. In a wheel of the class described, a spoke having a bifurcated inner or hub end, each end of the fork thus formed being divided at an angle to the line of bifurcation and the outer end of said spoke being likewise forked for attachment to the rim.

3. A spoke having bifurcated outer and inner ends, the members of the fork at the inner end being subdivided at an angle to the line of bifurcation, said spoke having an intermediate spring.

4. A spoke having bifurcated outer and inner ends, the members of the fork at the inner end being subdivided at an angle to the line of bifurcation, said spoke having an intermediate S-shaped bent portion forming a spring.

5. A wheel comprising a rim, a centrally-disposed hub with flanges upon its ends having spaced perforations, spokes having forked inner ends engaging said perforations with one or more perforations between each adjacent pair of said forked ends, whereby the forks of each of the spokes engage the one or more perforations between the forks of the adjacent spokes, and with springs in said spokes between said forked ends and said rim, substantially as described.

6. A wheel comprising a rim, a centrally-disposed hub having spaced flanges on its ends, spokes having forked extremities engaging said hub and rim, and with springs in said spokes between said bracing ends, substantially as described.

7. A wheel comprising a rim, a centrally-disposed hub having spaced flanges on its ends, spokes having forked extremities engaging said hub and rim, and with the portion between the forked ends bent into S shape, whereby the spokes are bracingly connected to the hub and rim, and resilient portions provided in the spokes between said forked ends, substantially as described.

8. A wheel comprising a rim, a centrally-disposed hub formed with lateral flanges on its ends with spaced perforations therein, spokes having diverging braces engaging said flanges at opposite points and at separate points on the flanges with one or more of said perforations between each adjacent set of said braces, whereby each of said braces engage one or more of said perforations in said opposite flanges between the forked ends of the adjacent spokes, substantially as described.

9. A wheel comprising a rim having concaved outer surface, a yieldable tire supported in said concave, a hub having lateral flanges upon its ends with spaced perforations therein, spokes having forked inner ends engaging said perforations and with forked outer ends engaging said rim, and springs in said spokes between said forked ends, substantially as described.

10. In a wheel, a rim having concaved outer surface, a yieldable tire supported in said concave, a hub having lateral flanges upon its ends with spaced perforations therein, spokes having forked inner ends engaging said flanges, and with forked outer ends engaging said rim, substantially as described.

11. A wheel comprising a rim, a centrally-disposed hub having spaced lateral flanges at its ends, spokes having forked portions diverging therefrom and engaging said flanges at opposite points, and springs in said spokes between said hub-engaging forked portion and rim, substantially as described.

12. A wheel comprising a rim, a centrally-disposed hub, spaced spokes having forked inner ends engaging said hub at separated points, and springs in the spokes between said hub and said rim, substantially as described.

In testimony that I claim the foregoing as my own I have hereto affixed my signature in the presence of two witnesses.

JOSEPH DICAIRE.

Witnesses:
HENRY D. LEFEBVRE,
WILLIAM F. DEVLIN.